United States Patent [19]

Sommer

[11] Patent Number: 4,921,078
[45] Date of Patent: May 1, 1990

[54] ELECTRO-SHEAR BRAKE

[75] Inventor: Gordon M. Sommer, Boca Raton, Fla.

[73] Assignee: Sommer Company, Warren, Mich.

[21] Appl. No.: 157,925

[22] Filed: Feb. 18, 1988

[51] Int. Cl.$^5$ .............................................. F16D 55/26
[52] U.S. Cl. .................................. 188/171; 188/264 E
[58] Field of Search ................... 188/170, 171, 264 E, 188/264 CC

[56] References Cited

U.S. PATENT DOCUMENTS

| 2,077,888 | 4/1937 | Larsh | 188/171 |
| 2,215,909 | 9/1940 | McWhirter et al. | 188/171 |
| 2,262,352 | 11/1941 | Arnold et al. | 188/171 |
| 2,368,317 | 1/1945 | Meyer et al. | 188/171 |
| 2,410,183 | 10/1946 | Ray | 188/171 |
| 2,620,900 | 12/1952 | Du Rosto | 188/264 E |

Primary Examiner—Duane A. Reger
Attorney, Agent, or Firm—Harness, Dickey & Pierce

[57] ABSTRACT

A motor brake unit comprising a housing member defining a fluid chamber disposed about the motor shaft of a motor, a shaft sleeve disposed within the fluid chamber nestingly engaging the motor shaft for rotation therewith, a first plurality of brake elements rotatable with the shaft sleeve, a brake collar secured to the housing member and disposed annularly about said shaft sleeve, a second plurality of brake elements non-rotatably supported by the brake collar, a pole piece for selectively engaging and disengaging the brake elements, biasing means for normally biasing the pole piece to engage the brake elements, and a plurality of electromagnetic coils for selectively attracting the pole piece axially opposite the biasing force to disengage the brake elements.

3 Claims, 2 Drawing Sheets

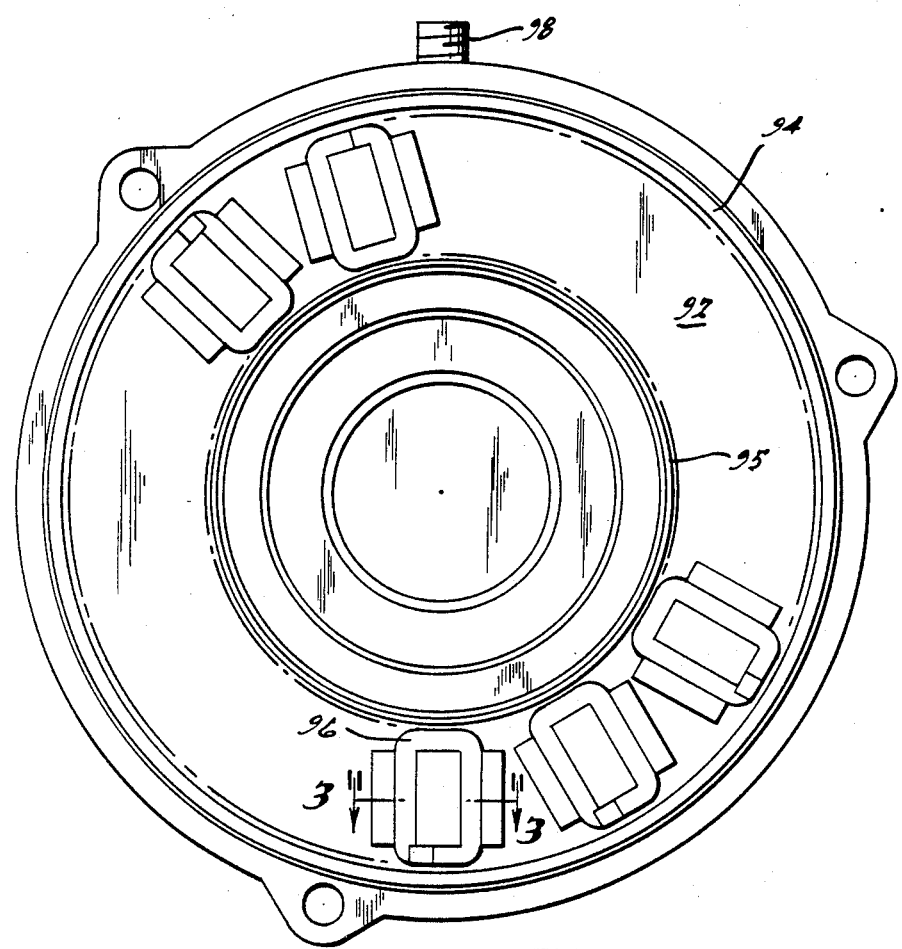
FIG. 2.
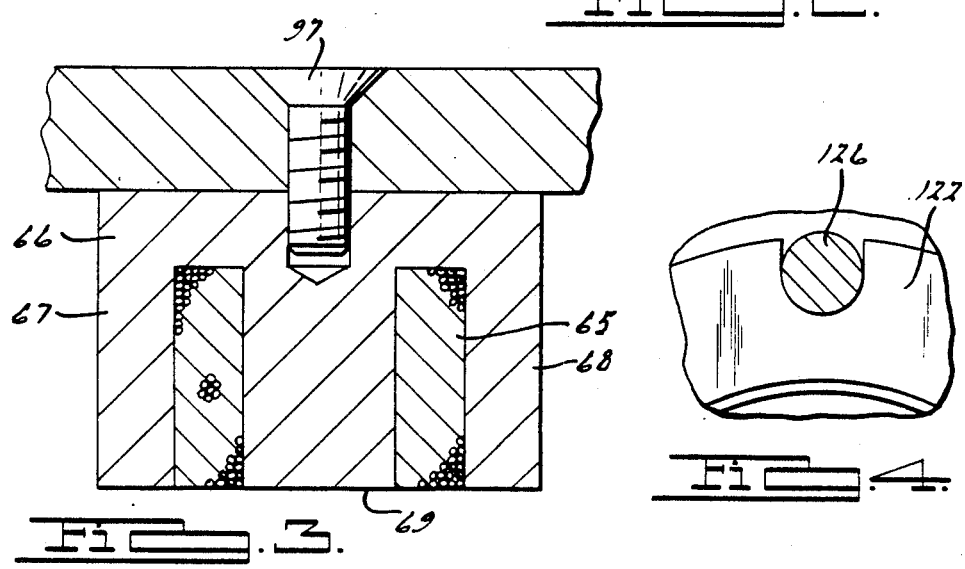
FIG. 3.
FIG. 4.

ELECTRO-SHEAR BRAKE

BACKGROUND AND SUMMARY OF THE INVENTION

The present invention relates, generally, to a motor brake unit wherein the braking elements thereof are submerged in a cooling fluid medium which provides for maximum cooling and minimum wear, such as is disclosed in applicant's U.S. Pat. No. 3,680,666, issued Aug. 1, 1972, and more particularly, an electro-mechanically controlled motor brake unit.

In simple terms, the oil shear principle is based on the use multiple disc packs bathed in oil. A positive oil film is maintained between the disc surfaces Torque is transmitted by the viscous shearing of this oil film. The result is that the wear of friction surfaces is greatly reduced. Heat is dissipated by the circulating oil for fast cyclic capability.

The present invention avoids problems such as coolant infiltration, chips, glazing, erratic operation due to air pressure fluctuations, slow response and cycle times, costly maintenance, and other design and operational problems which are inherent with open to atmosphere brakes. The present invention is a totally enclosed, completely assembled unit that can be mounted directly to standard "C" faced motors, or to through-shaft applications.

In operation the present invention is cool and quiet, making it suitable for use in all areas where noise level is a concern, including manufacturing, medical, forestry, and other environments. The brake is also well suited for for mining, chemical, agriculture, and gas industries applications. Being impervious to water, the present invention is also suitable for food processing and marine applications.

The present invention minimizes required maintenance, reducing down-time and lost production due to brake failure. Further, production may increase due to the faster AC cycle rate of the brake, when compared to the slow response time of AC converted to DC brakes. The present invention does not require time delay relays or power supplies; its response is nearly instantaneous.

The present invention also minimizes extensive production loss during installation, or retro fitting. The brake is a totally enclosed, self-contained unit which fits standard motor mounts with mounting adapters. Special adapters can be utilized for non-standard mountings. The present invention is a compatible replacement for most electric and air actuated motor brakes.

The brake is simply installed, it is attached to the mount and AC power leads are attached from the motor starter to an in-line fuse block, and then to the brake.

It is accordingly an important object of the present invention to provide a new and improved motor brake unit that utilizes a plurality of friction discs which are submerged in an oil bath that functions to effectively transfer the heat created during a braking operation away from the discs.

It is still another object of the present invention to provide a new and improved motor brake unit of the above described character that can be operated at high speeds and at high cyclic rates.

It is yet another object of the present invention to provide a new and improved motor brake unit that is extremely small and compact in size.

It is yet another object of the present invention to provide a new and improved motor brake unit that may be completely preassembled and which is entirely sealed to the atmosphere so as to prevent the ingress of any dirt, dust or other foreign material therein.

Other objects and advantages of the present invention will become apparent from the following detailed description taken in conjunction with the accompanying drawings.

BRIEF DESCRIPTION OF THE DRAWINGS

FIG. 2 is a cross-sectional view of the motor brake shown in FIG. 1 taken generally along Section 2—2.

FIG. 3 is a cross-sectional view of a coil assembly shown in FIG. 2 taken along Section 3—3.

FIG. 4 is a partial cross-sectional view of a brake disc shown in FIG. 1 taken along Section 4—4.

DETAILED DESCRIPTION OF THE PREFERRED EMBODIMENT

Figure 1:
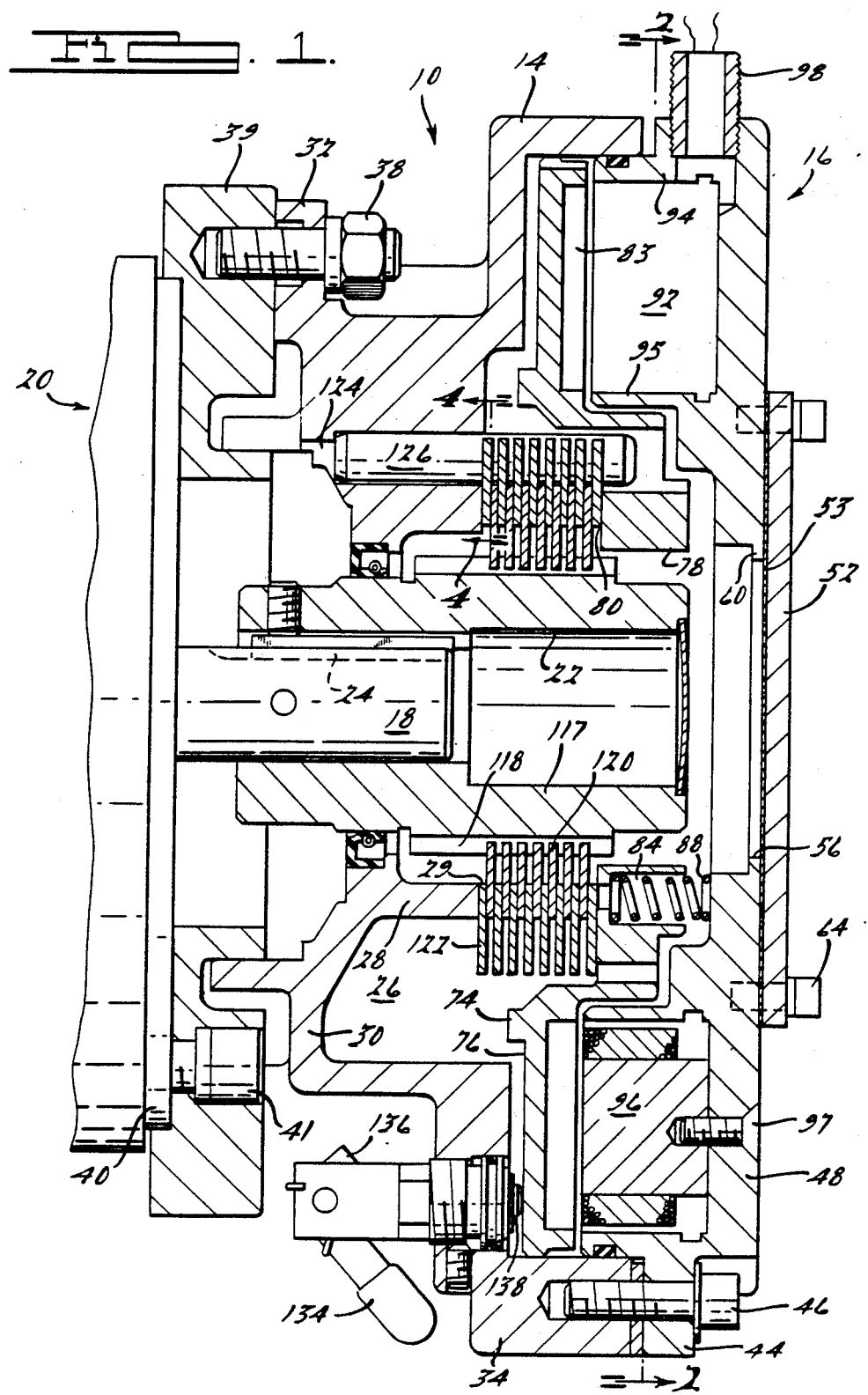
FIG. 1 is a longitudinal side elevational view, partly broken away, of a motor brake unit embodying the principles of the present invention.

Referring now in detail to the drawing, a motor brake unit 10 is shown as generally comprising a annular enclosure member 14 and a cap member 16. The enclosure member 14 is arranged axially or longitudinally of a rotatable motor shaft 18 seated within a conventional motor 20 and by a bearing assembly with which the unit 10 is operatively associated. The motor shaft 18 is surrounded by a concentrically oriented, longitudinally extending sleeve or collar 22 which is secured against rotation relative to the shaft 18 by means of a suitable longitudinally extending keyway 24. The sleeve 22 together with the enclosure member 14 and cap member 16 define an annular chamber or cavity 26 within which the brake elements of the present invention are operatively disposed, as will hereinafter be described in detail.

The enclosure member 14 comprises an abutment section 28 which defines a radially extending face 29 and is arranged radially outwardly from the collar 22 and secured to the member 14 by an integral, longitudinally and radially outwardly extending end wall 30. The member 14 also comprises a pair of radially outwardly extending, longitudinally spaced shoulders 32 and 34, the former of which serves to operatively secure the enclosure member 14 by means of a plurality of circumferentially spaced screws, bolts, or the like 38 to an annular adaptor member 39 which in turn is secured to an axially or longitudinally outwardly projecting lug section 40 formed in the end of the housing of the motor 20 by a plurality of circumferentially spaced screws, bolts, or the like 41. The shoulder 34 of the enclosure member 14 is adapted to be fixedly secured to a radially outwardly extending annular flange section 44 of the cap member 16 by means of a plurality of circumferentially spaced, axially extending screws, bolts, or the like 46, which results in the cap member 16, as well as the member 14, being fixedly secured against relative rotation with respect to the housing of the motor 20.

While one axial end of the chamber or cavity 26 is closed by the end wall section 30 of the enclosure member 14, the opposite end of said cavity 26 is closed by the end wall member 48 of the cap member 16. The end wall member 48 is formed with a central annular opening 56, defining an annular shoulder 60 is covered by an end cap 52 and sealed by an appropriate gasket 53 which are fastened to the end wall 48 by screws 64.

Optional accessories, such as a pulley assembly (not shown), may replace the end cap 62 and may be seated against the shoulder 60 and held in rotating engagement upon the shaft 18 by a collar with inwardly tapering sleeve and captively held by a shaft cap.

Disposed interiorly of the enclosure member 14 is an annular pole piece, generally designated 74, which comprises a main body portion 76 that is arranged coaxially of and spaced radially outwardly from the collar member 22 and motor shaft 18. Extending from the pole piece 74 radially inwardly is an abutment section 78 that defines a radially extending abutment face 80 and which is provided with a plurality of circumferentially spaced, axially extending annular bores or recesses, generally designated 84, which are adapted to nestingly receive a plurality of helical coil springs, one of which is shown in FIG. 1 and designated by the numeral 88. It will be seen that the plurality of springs 88 function to resiliently urge or bias the pole piece 74 toward the left in FIG. 1, whereby the face 80 of the pole piece 74 will function to effect a braking action on the motor shift 18, in a manner hereinafter to be described. The axially opposite (outer) end of the pole piece 74 is formed with an annulus 83. The annulus 83 contains a chemically bonded magnetically attractive laminate. In order to assure against fluid leakage from the cavity 26, suitable sealing means is provided to permit longitudinal reciprocal movement of the pole piece 74 and rotation of the shaft 18 and collar member 22 while preventing any fluid egress from the cavity 26.

Means for selectively actuating or reciprocating the pole piece 74 is provided by a plurality of electromagnetic coils 96 which are activated by an externally switched power source (not shown) communicating with the coils 96 through a threaded plug 98 in the exterior wall 94 of the cap member 16. The electromagnetic coils 96 are seated within an annular recess 92 of the cap member 16 defined by the exterior wall 94 and the internal sleeve 95. When an AC current is applied to the electromagnetic coils 96, activating the coils, the laminate of the pole piece 74 is attracted toward the coils 96, overcoming the biasing force of the coil springs 88 and pulling the pole piece 74 axially away from the motor.

The electromagnetic coils 96 are circumferentially arranged in the annular recess 92 as is best illustrated in FIG. 2. Each coil comprises an E-shaped laminate member consisting of a backing plate 66, end arms 67 and 68, and a center arm 69, which has wire 65 coiled thereupon (as illustrated in FIG. 3). Coils may also be formed upon a bobbin (not shown) with an elongated opening in the center which may be inserted over the center arm 69. Preferably, the bobbin would have an annular ring to divide the winding into two portions. The coils assemblies may be held in place by a screw 97 or may be "potted" in the annular recess 94 by a nonconductive material such as epoxy. The epoxy will entirely fill the annular recess 94 and cover the electrical connection between coils. The coils 96 are three phase AC coils which require no rectification and are therefor very responsive and fast in operation. Further, the coils 96 are preferably operated on 460 volts AC so that the brake may be electrically connected in parallel with the motor.

The collar 22 is formed with an radially outwardly extending section 117 which defines an external spline formation 118 adapted to operatively support a plurality of axially spaced, radially outwardly extending friction elements or discs, generally designated by the number 120, in a manner such that the discs 120 are free to move axially along the collar 22, yet are prevented from rotating relative thereto. Disposed interjacent or interleaved between the plurality of the friction discs 120 is a second plurality of friction elements or plates 122 (shown in FIG. 4) which are each formed with four recesses 123 adapted to slidingly engage four axially extending retaining dowels 126 that are press fit into bores 124 in the end wall 30. The dowels 126 are adapted to support the plurality of friction plates 122 for longitudinal sliding movement, yet prevent any relative rotation of said plates 122 with respect to the enclosure member 14. The plates 120 and plates 122 are fabricated of a suitable brake material well known to those skilled in the art and are adapted to function in a manner hereinafter to be described to effect a braking action on the motor shaft 18 and hence upon the associated motor 20 upon preselected actuation of the pole piece 74.

The present invention can serve the purpose of several brakes. The specified torque of the brake can be altered in the field by simply rearranging the existing disc pack. The ability of the brake to act as a momentary torque limiter is highly beneficial to certain machine and slide operations in preventing the development of excessive thrust due to signal delay. In most instances excessive thrust results in metal fatigue and eventually broken machine components.

The interior of the cavity 26 is adapted to be filled with a fluid cooling medium, such as oil, which functions in a manner such that a substantially high percent of the heat produced due to interaction between the friction discs 120 and plates 122 during a braking operation is transmitted or conducted directly to the enclosure member 14 and the cap member 16, whereby to effectively transmit such heat away from the interior of the motor brake unit 10. The particular configuration of the members 14 and 16 will be found to effect sufficient agitation or circulation of the cooling fluid (oil) so that sufficient heat transfer will be achieved without requiring any ancillary means for circulating said fluid, such as a fluid pump or the like.

Referring now to the overall operation of the motor brake unit 10, assuming the initial conditions that the interior of the cavity 26 is properly filled with a cooling fluid, the plurality of coil springs 88 will normally function to bias the pole piece 74 toward the left in FIG. 1, whereby the face 80 will exert a leftwardly directed force against the plurality of friction discs 120 and plates 122, with the result that said discs 120 and plates 122 will be compressed between the faces 80 and 29 so that an effective braking action is exerted against the motor shaft 18. At such time as it is desired to operate the motor, the braked condition is relieved by connecting the source of electricity to the coils 96 at the same time that the current is connected to the motor to start motor operation. The coils will then magnetically attract the pole piece 74 longitudinally toward the right in FIG. 1 against the resistance of the plurality of springs 88. Such longitudinal movement of the pole piece 74 will effect rightward movement of the face 80, resulting in disengagement of the same from the axially outermost of the friction plates 122, thereby releasing the shaft 18 to permit operation of the motor 20. When it is again desired to effect braking of the motor 20, the electromagnet is deactivated, with the result that the plurality of springs 88 will bias the pole piece 74 toward the left in FIG. 1, resulting in the face 80 thereof moving into engagement with the friction plates 122 and causing all of the friction discs 120 and plates 122 to be compressed between the faces 80 and 29. Additionally, the effective braking force may be controlled by adding or removing one or more springs 88, as will be apparent.

The brake unit may be manually disengaged through a threaded screw means or a manual release toggle 134 to overcome the biasing force of the coil springs 88 and translating the pole piece 74 axially to the right in FIG. 1. The manual release toggle 134 has a cam plate 136 which will drive the manual release rod 138 axially outward against the pole piece 74 when activated.

While it will be apparent that the preferred embodiments illustrated herein are well calculated to fulfill the objects above stated, it will be appreciated that the present invention is susceptible to modification, variation and change.

I claim:

1. A brake unit for use in combination with a motor having a housing with a generally radially disposed mounting end portion and a rotatable motor shaft projecting axially outwardly therefrom, a brake unit adapted to be surmounted axially onto said motor shaft and be fixedly attached to said mounting end portion, comprising:
    a unitary housing member defining a fluid chamber disposed about said motor shaft, said housing member being engagable with said mounting end portion;
    first fastening means for fixedly securing said housing member to said mounting end portion;
    a cap member engageable with said housing member; further defining said fluid chamber;
    a second fastening means for securing said cap member to said housing member in a sealing engagement;
    a shaft sleeve at least partially disposed within and defining said fluid chamber having a bore located at one end adapted to nestingly receive the motor shaft for rotation therewith;
    a first plurality of brake elements located in said fluid chamber and rotatable with said shaft sleeve;
    a brake collar at least partially disposed within said fluid chamber fixedly secured to said housing member, said brake collar disposed generally annularly about said shaft sleeve;
    a third fastening means for fixedly securing said brake collar to said housing member;
    a second plurality of brake elements located in said fluid chamber and non-rotatably supported upon said housing member;
    piston means, comprising at least one magnetically attracted surface, axially translatable relative to said motor shaft supported within said housing member for selectively engaging and disengaging said first and second plurality of brake elements;
    biasing means disposed within said fluid chamber for normally biasing said piston in an axial direction to affecting the engagement of said first and second brake elements; and
    an electromagnetic coil for selectively translating said piston means axially opposite the biasing means, to selectively disengage said first and second brake elements.

2. The brake unit of claim 1 wherein said actuating means comprises a threaded screw means disposed within said housing member and engageable with said piston means.

3. In combination with an electric motor having a housing with a generally radially disposed mounting end portion and a rotatable motor shaft projecting axially outwardly therefrom, a brake unit adapted to be surmounted axially onto said motor shaft and be fixedly attached to said mounting end portion, said brake unit comprising:
    a housing member defining a fluid chamber disposed about said motor shaft, said housing member being engageable with said mounting end portion;
    a shaft sleeve at least partially disposed within said fluid chamber having a bore located at one end adapted to nestingly receive the motor shaft for rotation therewith;
    a first plurality of brake elements located in said fluid chamber and rotatable with said shaft sleeve;
    a liquid heat transfer medium at least partially filling said fluid chamber;
    a brake collar at least partially disposed within said fluid chamber fixedly secured to said housing member, said brake collar disposed generally annularly about said shaft sleeve;
    fastening means for fixedly securing said brake collar to said housing member;
    a second plurality of brake elements located in said fluid chamber and non-rotatably supported by said brake collar;
    a pole piece means axially translatable relative to said motor shaft supported within said housing member abutting said second plurality of brake elements, said pole piece having an magnetically attractive portion and being selectively reciprocable to engage or disengage said first and second plurality of brake elements;
    biasing means disposed within said fluid chamber for normally biasing said pole piece in an axial direction to engage said first and second brake elements;
    at least one electromagnetic coil disposed adjacent to and normally axially spaced from said pole piece for selectively attracting said magnetically attractive portion of said pole piece axially opposite the biasing force exerted by said biasing means, to disengage said first and second brake elements; and
    said electromagnetic coil comprising a backing plate, two end pieces and a center piece extending from one face of said backing plate, and an electrically conductive material wound about said center piece between said end pieces.

* * * * *

UNITED STATES PATENT AND TRADEMARK OFFICE
CERTIFICATE OF CORRECTION

PATENT NO. : 4,921,078

DATED : May 1, 1990

INVENTOR(S) : Gordon M. Sommer

It is certified that error appears in the above-identified patent and that said Letters Patent is hereby corrected as shown below:

Col. 1, Line 14, after "use" insert --of--;

Col. 1, Line 15, after "surfaces" insert --.--;

Col. 1, Line 33, (second occurance), delete "for";

Col. 2, Line 23, "a" should be --an--;

Col. 3, Line 21, "shift" should be --shaft--;

Col. 3, Line 55, "coils" should be --coil--;

Col. 3, Line 65, "an" should be --a--;

Col. 5, Line 54, Claim 1, "attracted" should be --attracting--;

Col. 5, Line 59, Claim 1, after "piston" insert --means--;

Col. 6, Line 1, Claim 1, "affecting" should be --effect--;

Col. 6, Line 41, Claim 3, "an" should be --a--.

Signed and Sealed this

Twenty-second Day of September, 1992

*Attest:*

DOUGLAS B. COMER

*Attesting Officer*   *Acting Commissioner of Patents and Trademarks*